United States Patent
Hibino et al.

(10) Patent No.: US 10,300,745 B2
(45) Date of Patent: May 28, 2019

(54) PNEUMATIC TIRE

(71) Applicant: Sumitomo Rubber Industries, Ltd., Kobe-shi, Hyogo (JP)

(72) Inventors: Atsushi Hibino, Kobe (JP); Kaori Tanaka, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 15/142,637

(22) Filed: Apr. 29, 2016

(65) Prior Publication Data

US 2016/0318352 A1 Nov. 3, 2016

(30) Foreign Application Priority Data

Apr. 30, 2015 (JP) ................................ 2015-093022
Oct. 14, 2015 (JP) ................................ 2015-203076

(51) Int. Cl.
- B60C 11/13 (2006.01)
- B60C 11/03 (2006.01)
- B60C 11/12 (2006.01)

(52) U.S. Cl.
CPC ...... B60C 11/1307 (2013.01); B60C 11/0306 (2013.01); B60C 11/0327 (2013.01); B60C 11/125 (2013.01); B60C 11/1236 (2013.01); B60C 11/1263 (2013.01); B60C 2011/0341 (2013.01); B60C 2011/0355 (2013.01);
(Continued)

(58) Field of Classification Search
CPC ............. B60C 11/0327; B60C 11/1307; B60C 11/0306; B60C 11/1236; B60C 11/125; B60C 11/1263
See application file for complete search history.

(56) References Cited

U.S. PATENT DOCUMENTS

| | | | | |
|---|---|---|---|---|
| 2006/0011279 A1* | 1/2006 | Miyasaka | ........... | B60C 11/0306 152/209.15 |
| 2009/0090445 A1* | 4/2009 | Itou | ..................... | B60C 11/0306 152/209.25 |
| 2010/0200138 A1* | 8/2010 | Shibano | .................. | B60C 11/12 152/209.25 |

FOREIGN PATENT DOCUMENTS

| | | | |
|---|---|---|---|
| JP | 2003-11619 A | 1/2003 | |
| JP | 2003011619 A | * 1/2003 | ........... B60C 11/125 |

(Continued)

OTHER PUBLICATIONS

Extended European Search Report for European Application No. 16165959.4, dated Sep. 28, 2016.

*Primary Examiner* — Jacob T Minskey
*Assistant Examiner* — Melody Tsui
(74) *Attorney, Agent, or Firm* — Birch, Stewart, Kolasch & Birch LLP

(57) ABSTRACT

A pneumatic tire includes a tread portion provided with a land portion with a plurality of lateral grooves extending across the land portion. Each lateral groove includes a main portion with a width equal to or more than 2.0 mm and a sipe portion extending radially inwardly from a bottom of the main portion. The main portion includes a first wall located on a first side in a circumferential direction and a second wall located on a second side in the circumferential direction. The sipe portion includes a first sipe wall located on the first side and a second sipe wall located on the second side. The lateral grooves include a first lateral groove having the first wall being continuous to the first sipe wall smoothly and a second lateral groove having the second wall being continuous to the second sipe wall smoothly.

13 Claims, 7 Drawing Sheets

(52) U.S. Cl.
CPC ........... *B60C 2011/0365* (2013.01); *B60C 2011/0367* (2013.01); *B60C 2011/0372* (2013.01)

(56) References Cited

FOREIGN PATENT DOCUMENTS

| | | | | | |
|---|---|---|---|---|---|
| JP | 2003011619 A | * | 1/2003 | ........... | B60C 11/125 |
| JP | 2003-182313 A | | 7/2003 | | |
| JP | 2003182313 A | * | 7/2003 | ........... | B60C 11/125 |
| JP | 2004-217120 A | | 8/2004 | | |

* cited by examiner

PNEUMATIC TIRE

BACKGROUND ART

Field of the Invention

The present invention relates to pneumatic tires, and in particular to a pneumatic tire capable of improving noise performance.

Description of the Related Art

Japanese Unexamined Patent Application Publication No. 2004-217120 discloses a pneumatic tire including a tread portion with land portions provided with lateral grooves each extending across the land portions, for example. Each lateral groove is configured to have a main portion having a width of more than 2.0 mm and a sipe portion extending from a bottom of the main portion in order to offer better wet performance while ensuring steering stability.

Unfortunately, since the lateral grooves are configured as the same size and shape, tire traveling noise in a certain frequency range produces as they rolled through contact with the road. This would result a large monotonous tire noise in a specific frequency band by being overlapped the same frequency noise.

SUMMARY OF THE INVENTION

In view of the above problems in the conventional art, the present invention has an object to provide a pneumatic tire capable of improving noise performance by employing an improved lateral groove structure.

According to one aspect of the invention, a pneumatic tire includes a tread portion being provided with at least one circumferentially and continuously extending main groove and at least one land portion adjacent to the main groove. The land portion is provided with a plurality of lateral grooves extending across the land portion. Each lateral groove includes a main portion having a width equal to or more than 2.0 mm and a bottom, and a sipe portion having a width smaller than the width of the main portion and extending radially inwardly from the bottom of the main portion. The main portion includes a first wall located on a first side in a circumferential direction of the tire and a second wall located on a second side in the circumferential direction of the tire. The sipe portion includes a first sipe wall located on the first side and a second sipe wall located on the second side. The lateral grooves include a first lateral groove having the first wall being continuous to the first sipe wall smoothly and a second lateral groove having the second wall being continuous to the second sipe wall smoothly. The first lateral groove and the second lateral groove are arranged alternately in the circumferential direction of the tire.

In another aspect of the invention, depths of the lateral grooves may be in a range of from 0.50 to 0.90 times of a depth of the main groove.

In another aspect of the invention, at least one of the lateral grooves may include the sipe portion including an axially central part and a pair of end parts having depths greater than that of the central part.

In another aspect of the invention, at least one of the lateral grooves may include the main portion having a width increasing toward the main groove.

In another aspect of the invention, the at least one main groove may include a pair of crown main grooves to form a crown land portion therebetween on a tire equator and at least one middle land portion disposed axially outward of one of the crown main grooves, the lateral grooves may include a plurality of crown lateral grooves on the crown land portion and a plurality of middle lateral grooves on the middle land portion, and the crown lateral grooves and the middle lateral grooves may be arranged alternately in the circumferential direction of the tire.

In another aspect of the invention, each of the middle lateral grooves may curve in an arc shape in a plan view of the tread portion, and a center of curvature of the arc shape may be located axially inward with respect to a center of the middle portion in an axial direction of the tire.

In another aspect of the invention, a radius of curvature of each middle lateral groove may be in a range of from 0.80 to 1.05 times of a width of the middle land portion.

In another aspect of the invention, the crown lateral grooves may extend in a straight shape at an angle of from 10 to 30 degrees with respect to the axial direction of the tire.

In another aspect of the invention, each of the crown lateral grooves may extend so as to continue to each of the middle lateral grooves smoothly through the crown main groove.

DESCRIPTION OF THE PREFERRED EMBODIMENTS

An embodiment of the present invention will be explained below with reference to the accompanying drawings.

Figure 1:
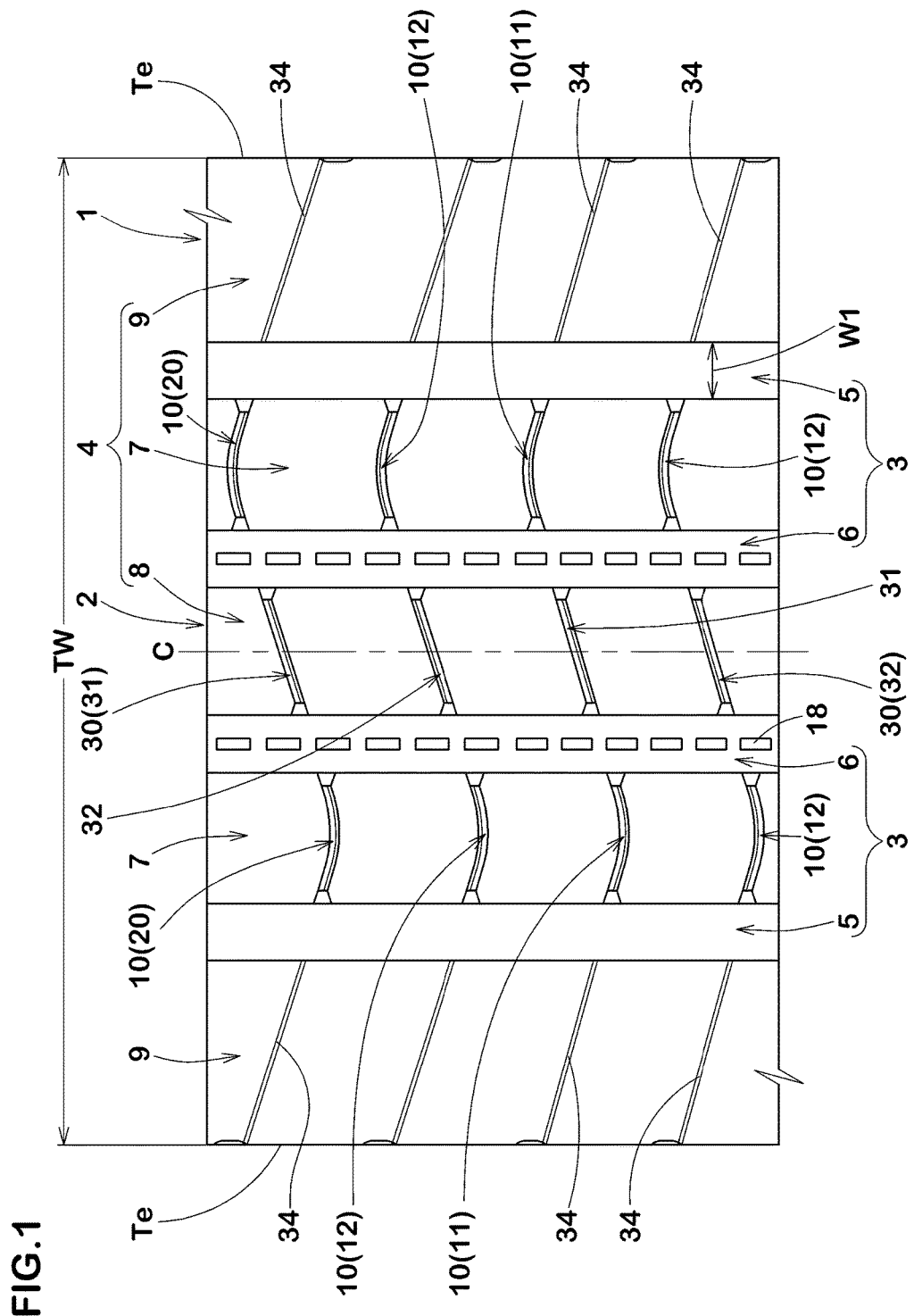
FIG. 1 is a development view of a tread portion of a pneumatic tire according to an embodiment of the present invention.

FIG. 1 illustrates a tread portion 2 of a pneumatic tire 1 according to an embodiment of the present invention. The pneumatic tire 1 illustrated in FIG. 1 is embodied as a heavy duty tire for trucks or buses, for example.

As illustrated in FIG. 1, the tread portion 2 of the tire 1 is provided with at least one circumferentially and continuously extending main groove 3 and at least one land portion 4 adjacent to the main groove 3.

The at least one main groove 3 includes a pair of shoulder main grooves 5 and 5, and a pair of crown main grooves 6 and 6.

Each shoulder main groove 5 extends in a straight shape proximate to a tread edge Te on each side of the tire equator C. Alternatively, each shoulder main groove 5, for example, extends in a wavy or zigzag shape.

As used herein, the tread edges Te refer to axially outermost edges of the ground contacting patch of the tread portion 2 which occurs under a normally inflated loaded condition when the camber angle of the tire 1 is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

Unless otherwise noted, dimensions of respective portions of the tire are values specified in a normally inflated unloaded condition such that the tire 1 is mounted on the standard wheel rim with the standard pressure, but is loaded with no tire load.

The crown main grooves 6 are arranged between the shoulder main grooves 5. In this embodiment, the crown main grooves 6 are arranged so as to include the tire equator C therebetween, for example. Alternatively, a single crown main groove 6 may be arranged on the tire equator C.

The crown main grooves 6, for example, extend in a straight manner in the circumferential direction of the tire. Alternatively, the crown main grooves 6 may extend in a wavy or zigzag shape in the circumferential direction of the tire. Preferably, each bottom of the crown main grooves 6 is provided with a plurality of rectangular shaped protrusions 18 spaced in the circumferential direction of the tire to prevent stone trapping in the main groove.

Preferably, each width W1 of the main grooves 5 and 6, for example, is in a range of from 3.0% to 7.0% of the tread width TW. Here, the tread width TW is defined as an axial distance between the tread edges Te and Te under the normally inflated unloaded condition. Preferably, each depth of the main grooves 5 and 6, for example, is in a range of from 10 to 25 mm when the tire is a heavy duty tire.

The at least one land portion 4, for example, includes a crown land portion 8 on the tire equator C, a pair of middle land portions 7 each disposed axially outward of the crown land portion 8, and a pair of shoulder land portion 9 each disposed axially outward of each middle portion 7.

Figure 2:
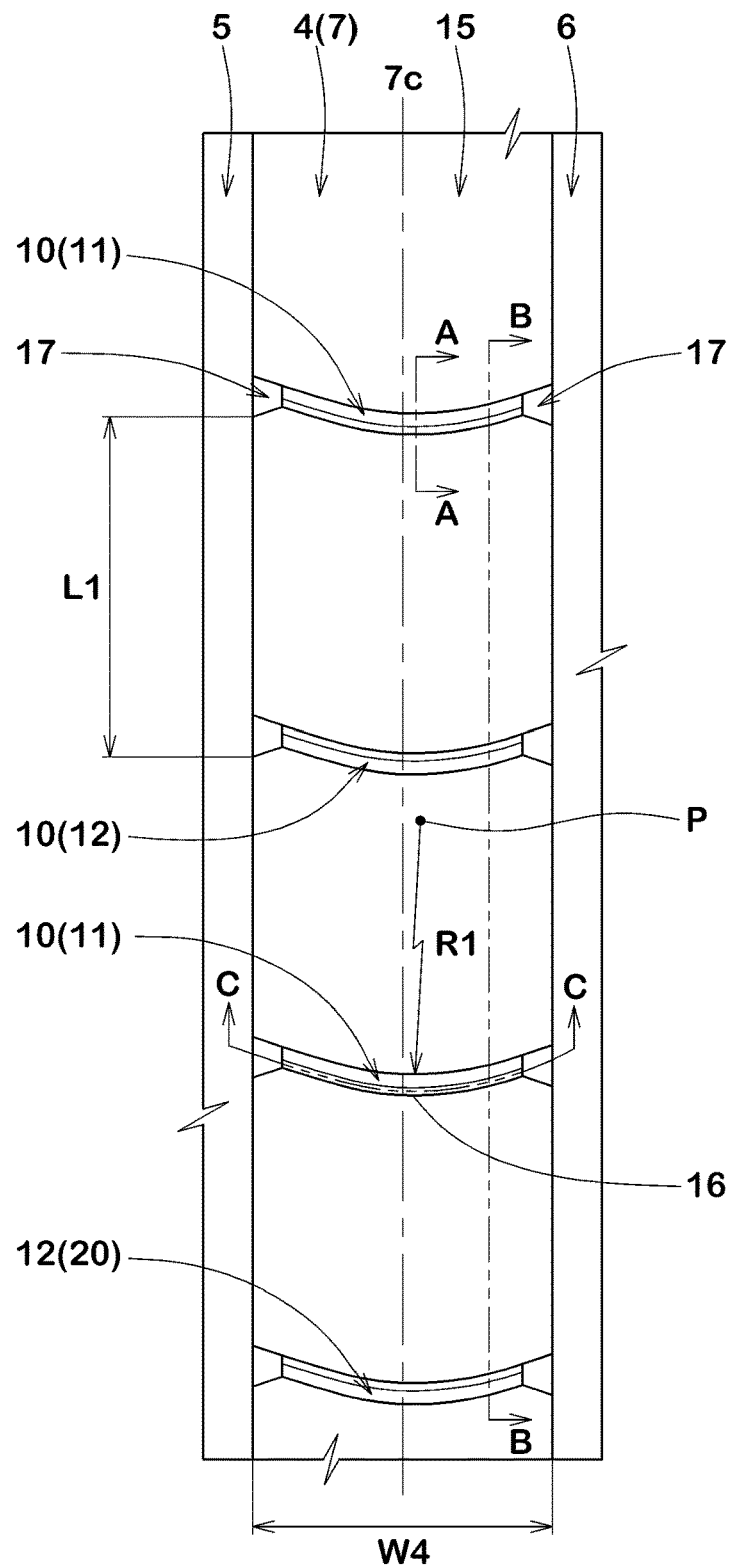
FIG. 2 is an enlarged view of a middle land portion of FIG. 1.

FIG. 2 illustrates an enlarged view of the middle land portion 7, as a representative example of the land portions 4. As illustrated in FIG. 2, at least one of the land portion 4 is provided with a plurality of lateral grooves 10 extending across the land portion 4.

Figure 3:
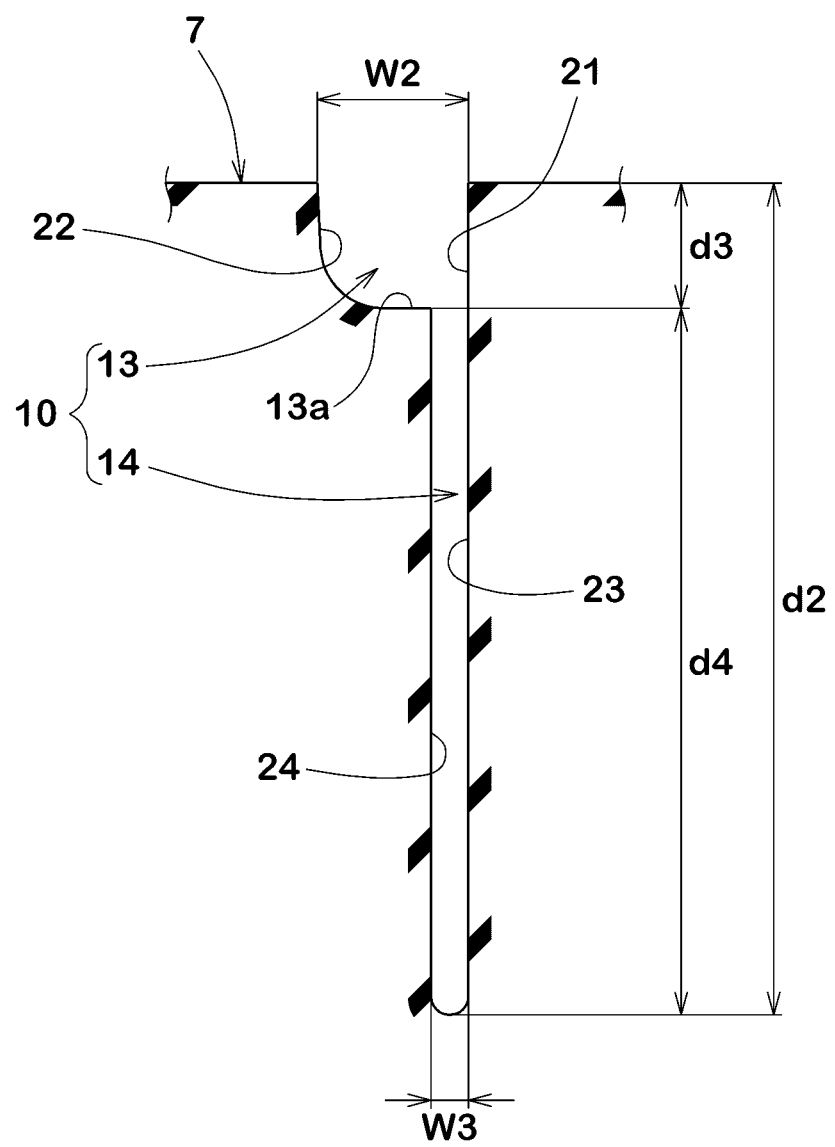
FIG. 3 is a cross-sectional view taken along a line A-A of FIG. 2.

FIG. 3 illustrates a cross-sectional view of the lateral groove 10 taken along a line A-A of FIG. 2. As illustrated in FIG. 3, the lateral grooves 10 include a main portion 13 and a sipe portion 14. The main portion 13 includes a width W2 equal to or more than 2.0 mm opened at the ground contact surface of the land portion and a bottom 13a.

The sipe portion 14 extends radially inwardly from the bottom 13a of the main portion 13 and has a width W3 which is smaller than the width W2 of the main portion 13. Preferably, the width W3 of the sipe portion 14 is in a range of from 0.5 to 1.5 mm. The sipe portion 14 may increase a volume of the lateral grooves 10. On the other hand, the sipe portion 14 may close so that an apparent rigidity of the land portion increases when a large circumferential shearing force acts on the land portion. Thus, the tire according to the present embodiment may offer an excellent wet performance and steering stability.

The main portion 13 includes a first wall 21 located on a first side (the right side in FIG. 3) in the circumferential direction of the tire and a second wall 22 located on a second side (the left side in FIG. 3) in the circumferential direction of the tire. The sipe portion 14 includes a first sipe wall 23 located on the first side and a second sipe wall 24 located on the second side. In this embodiment, either the first sipe wall 23 or the second sipe wall 24 is continuous to either the first wall 21 or the second wall 22. The details of the main portion 13 and the sipe portion 14 will be described later.

Figure 4:
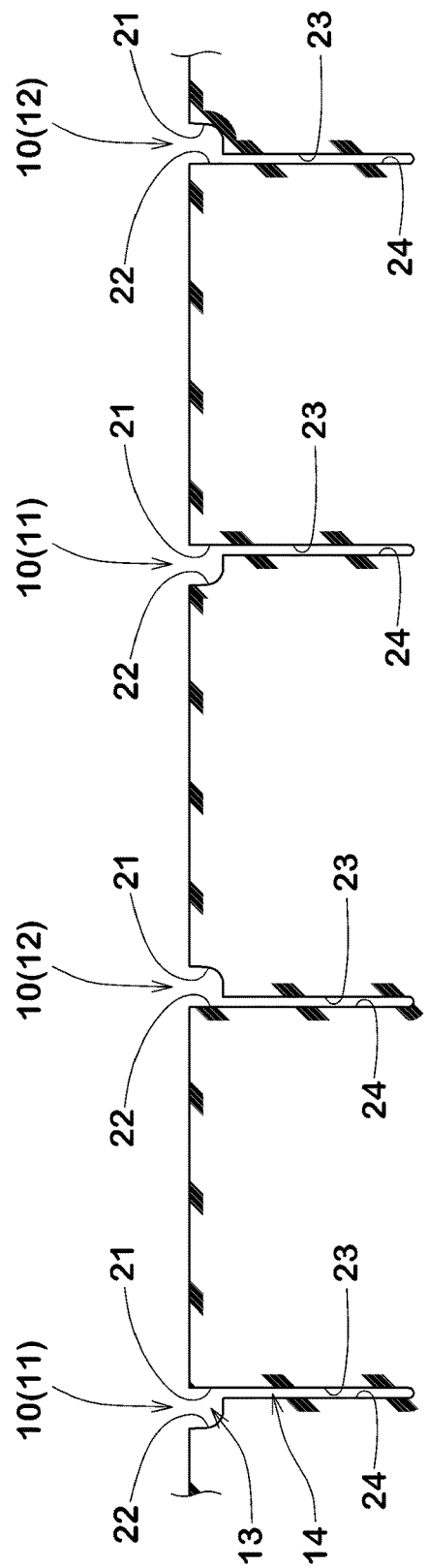
FIG. 4 is a cross-sectional view taken along a line B-B of FIG. 2.

FIG. 4 illustrates a cross-sectional view taken along a line B-B of FIG. 2. FIG. 4 is a cross-sectional view including a plurality of lateral grooves 10. As illustrated in FIG. 4, the lateral grooves 10 include a first lateral groove 11 and a second lateral groove 12. The first lateral groove 11 includes the first wall 21 being continuous to the first sipe wall 23 smoothly so as to form a single plane wall. The first lateral groove 11 also includes the second wall 22 connected to the second sipe wall 24 in a step manner. On the other hand, the second lateral groove 12 includes the second wall 22 being continuous to the second sipe wall 24 smoothly so as to form a single plane wall. The second lateral groove 12 also includes the first wall 21 connected to the first sipe wall 23 in a step manner. Furthermore, the first lateral groove 11 and the second lateral groove 12 are arranged alternatively in the circumferential direction of the tire.

These lateral grooves 10 including the first lateral groove 11 and the second lateral groove 12 may disperse the frequency of the noise generated by the lateral grooves 10 to produce "white noise" as they rolled through contact with the road. Furthermore, each separated piece of the land portion between the first lateral groove 11 and the second lateral groove 12 tends to have different rigidity. Thus, the separated pieces of the land portion would also generate different impact tone or level to produce "white noise" of the impact sound as they rolled through contact with the road. Accordingly, the tire in accordance with the present embodiment may offer an excellent noise performance.

As illustrated in FIG. 3, the lateral grooves 10 preferably have a maximum depth d2 in a range of not less than 0.50 times of the depth d1 (not shown) of the main groove, more preferably not less than 0.60 times, but preferably not more than 0.90 times, more preferably not more than 0.80 times. These lateral grooves 10 may be useful to improve steering stability and wet performance in good balance.

Preferably, the widths W2 of the main portions 13 are in a range of from 2.0 to 4.0 mm, more preferably in a range of from 2.5 to 3.0 mm in order to improve wet performance while ensuring wear resistance of the ground contact surface.

In the same point of view, the main portions 13 preferably have a depth d3 of not less than 1.5 mm, more preferably not less than 2.0 mm, but preferably not more than 4.0 mm, more preferably not more than 3.0 mm.

Each of the sipe portions 14 has a depth d4 measured from the bottom 13a of the main portion 13 to a bottom of the sipe portion 14 in the radial direction of the tire. Preferably, the depth d4 is in a range of not less than 4.5 times of the depth d3 of the main portions 13, more preferably not less than 5.0 times, but preferably not more than 6.5 times, more preferably not more than 6.0 times in order to further improve wet performance of the tire while suppressing heel and toe wear on the respective separated pieces of the land portion.

Figure 5:
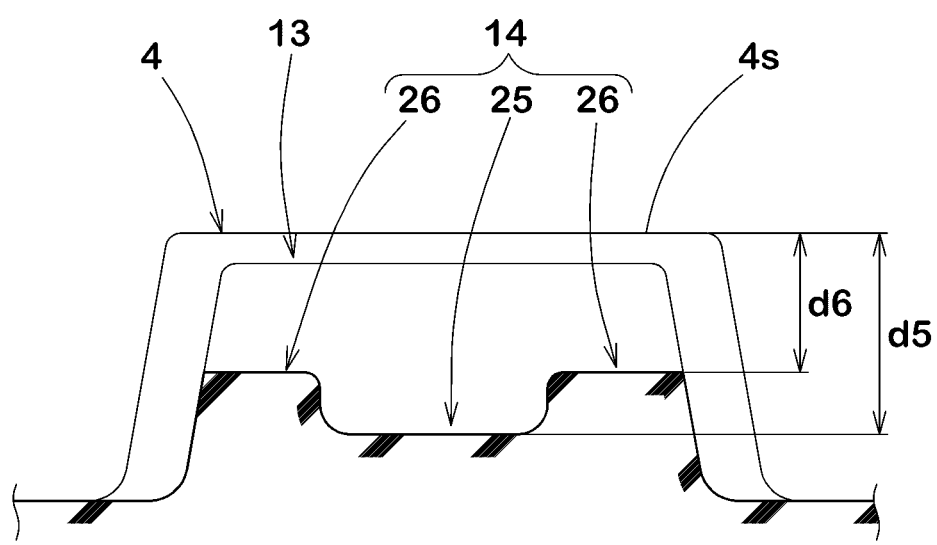
FIG. 5 is a cross-sectional view taken along a line C-C of FIG. 2.

FIG. 5 illustrates a cross-sectional view taken along a line C-C of FIG. 2. As illustrated in FIG. 5, the sipe portion 14 may include an axially central part 25 and a pair of end parts 26 having depths different from that of the central part 25. In this embodiment, the end parts 26 have depths smaller than that of the central part 25. This structure may restrain the sipe portion 14 not to open excessively.

The end parts 26 have depths d6 from the ground contact surface 4s, and the central part 25 has a depth d5 from the ground contact surface 4s. Preferably, the ratio d6/d5 is in a range of not less than 0.40, more preferably not less than 0.55, but preferably not more than 0.80, more preferably not more than 0.65 in order to improve wet performance and steering stability in good balance.

As illustrated in FIG. 2, the middle lateral grooves 20, which are included in a group of the lateral grooves 10, preferably extend in an arc shape in a plan view of the tread portion 2. Such middle lateral grooves 20 may be useful to suppress uneven wear of the land portion to be generated on groove edges thereof by dispersing stress applied thereto. Furthermore, when the middle land portion 7 receives lateral force, a pair of opposing sipe surfaces of each middle lateral groove 20 may come into contact with each other so that lateral rigidity of the land portion may enhance.

Preferably, the middle lateral grooves 20 curve so that a center P of curvature of the arc shape is located in an inner region 15 of the middle land portion 7. The inner region 15 of the middle land portion 7 is the inner half region of the middle land portion 7 in the axial direction of the tire which is between the center line 7c of the middle land portion 7 and the crown main groove 6.

An angle of each middle lateral groove 20 with respect to the axial direction of the tire increases axially outwardly gradually from at least the center line 7c. This would prevent shearing deformation of the middle land portion 7 in the axial direction effectively, and offer better linear steering response during cornering.

Furthermore, each middle lateral groove 20 includes a circumferential peak point 16 located in the inner region 15 of the middle land portion 7 since the center of curvature of the arc shape is located in the inner region 15. Meanwhile, large ground contact pressure applies to the inner region 15 of the middle land portion 7. Thus, a groove edge of a portion around the peak point 16 may strongly scratch the ground covered with water using the large ground contact pressure, thereby improving wet performance.

When the radius of curvature R1 of each middle lateral groove 20 is excessively small, uneven wear tends to occur from a groove edge of the middle lateral groove 20. When the radius of curvature R1 of each middle lateral groove 20 is excessively large, wet performance of the tire tends to deteriorate. Preferably, the radius of curvature R1 of each middle lateral groove 20 is in a range of not less than 0.80 times, more preferably not less than 0.90 times, but preferably not more than 1.05 times, more preferably not more than 0.95 times of the width W4 of the middle land portion 7.

Each of the middle lateral grooves 20 has axially outer end portions 17 in the main portion 13. Preferably, at least one axially outer end portion 17 has a width increasing toward the main groove to which the axially outer end portion 17 connects. This may suppress uneven wear to be generated on a corner portion formed between the main groove and the middle lateral groove 20. More preferably, each of the middle lateral grooves 20 further includes an intermediate portion of the main portion having a substantially constant width between the axially outer end portions 17. This may disperse stress on the groove edges of the middle lateral grooves 20 more effectively to suppress uneven wear thereon.

In order to improve wet performance and steering stability in good balance, the circumferential respective pitches L1 between adjacent middle lateral grooves 20 and 20 are preferably not less than 1.05 times, more preferably not less than 1.10 times, but preferably not more than 1.25 times, more preferably not more than 1.20 times, with respect to the width W4 of the middle land portion 7.

As illustrated in FIG. 1, the middle lateral grooves 20 arranged on the right side of the tire equator C are curved so as to protrude in one side in the circumferential direction of the tire and the middle lateral grooves 20 arranged on the left side of the tire equator C are curved so as to protrude in the other side in the circumferential direction of the tire. This groove arrangement would ensure improved scratching effect of the middle lateral grooves 20 regardless of rotational direction of the tire.

Figure 6:
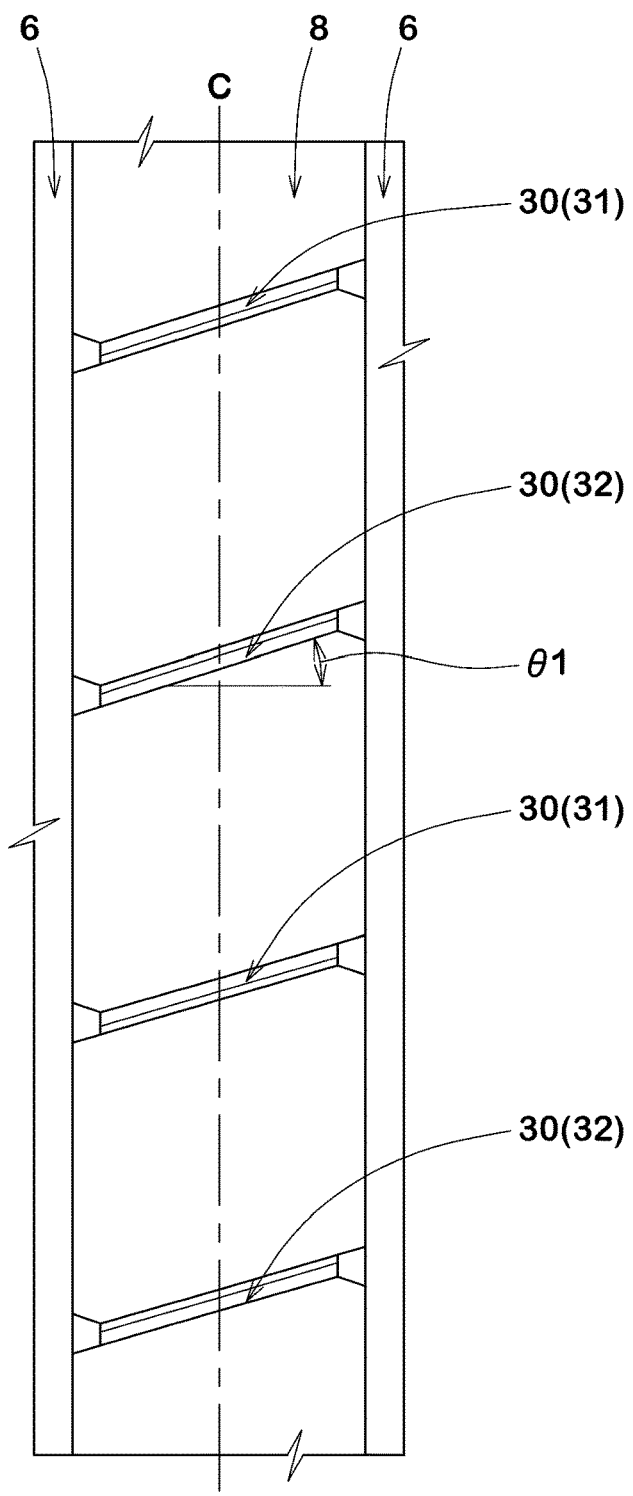
FIG. 6 is an enlarged view of a crown land portion of FIG. 1.

FIG. 6 illustrates an enlarged view of the crown land portion 8. As illustrated in FIG. 6, the crown land portion 8 is provided with a plurality of crown lateral grooves 30. The crown lateral grooves 30, for example, traverse the crown land portion 8 to connect the crown main grooves 6. The crown lateral grooves 30, for example, extend in a straight shape with an inclination relative to the axial direction of the tire. The angle θ1 of each crown lateral groove 30 relative to the axial direction of the tire, for example, is preferably not less than 5 degrees, more preferably not less than 10 degrees, but preferably not more than 40 degrees, more preferably not more than 30 degrees. The edges of the crown lateral grooves 30 may increase friction between the tread portion and the ground in particular on wet ground.

Preferably, the crown lateral grooves 30 include the same cross-section as the lateral grooves 10 illustrated in FIG. 3. That is, the crown lateral grooves 30, for example, include the main portion having a width equal to or more than 2.0 mm and a bottom, and the sipe portion having a width smaller than the width of the main portion and extending radially inwardly from the bottom of the main portion.

In this embodiment, the crown lateral grooves 30 include a first crown lateral groove 31 and a second crown lateral groove 32. The structure of the first crown lateral grooves 31 and the second crown lateral grooves 32 correspond to the structure of the first lateral groove 11 and the second lateral groove 12 respectively as illustrated in FIG. 4. That is, the respective first crown lateral grooves 31 have the first wall being continuous to the first sipe wall smoothly, and the respective second crown lateral grooves 32 have the second wall being continuous to the second sipe wall smoothly (not illustrated). Furthermore, the first crown lateral grooves 31 and the second crown lateral grooves 32 are arranged alternately in the circumferential direction of the tire. This would further improve noise performance of the tire.

As illustrated in FIG. 1, preferably, each crown lateral groove 30 is arranged in different position to each middle lateral grooves 20 in the circumferential direction of the tire. This groove arrangement would suppress a sound pressure of pumping noise due to lateral grooves 20 and 30 since the crown lateral grooves 30 and the middle lateral grooves 20 do not come into contact with the ground at the same time.

More preferably, each crown lateral groove 30, for example, may extend so as to continue smoothly to each of the middle lateral grooves 20 arranged on at least one of the middle land portions 7 through the crown main groove 6.

For example, as to a pair of axially adjacent crown lateral groove 30 and middle lateral groove 20, when one of the lateral grooves is extended imaginary, the extension line of the lateral groove may intersect or contact with the other lateral groove. Such a groove arrangement would disperse effectively water in the crown lateral grooves 30 axially outwardly so that the wet performance can further be improved.

In this embodiment, each first crown lateral groove 31 is arranged so as to continue to each first lateral groove 11, and each second crown lateral groove 32 is arranged so as to continue to each second lateral groove 12. This groove arrangement would bring a uniform wear on each portion divided by lateral grooves, thereby suppressing uneven wear.

Figure 7:
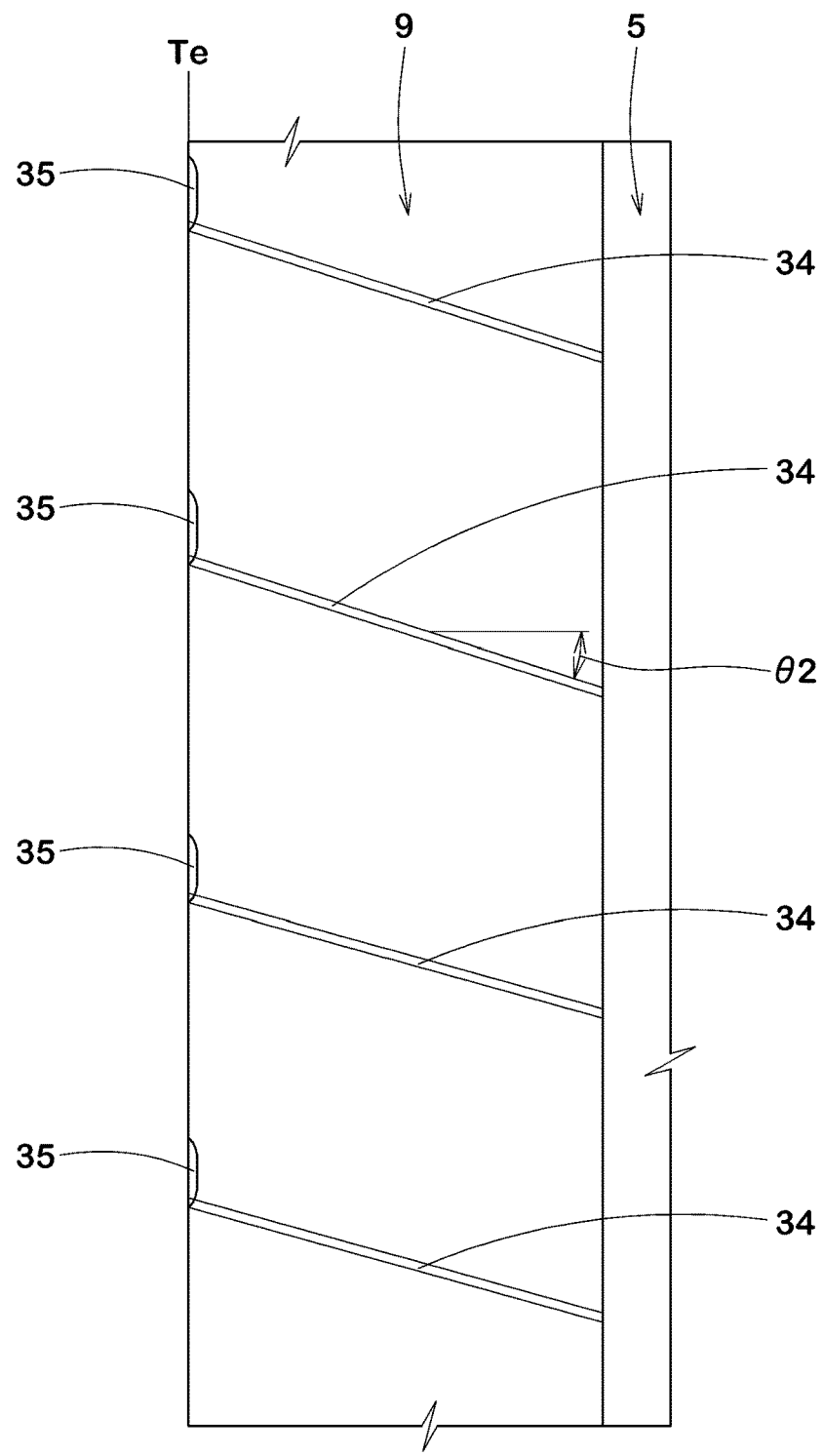
FIG. 7 is an enlarged view of a shoulder land portion of FIG. 2.

FIG. 7 illustrates an enlarged view of the shoulder land portion 9 illustrated in FIG. 1. As illustrated in FIG. 7, the shoulder land portion 9, for example, is provided with a plurality of shoulder sipes 34 and a plurality of recesses 35 on the tread edge Te. The shoulder sipes 34, for example, extend in a straight shape with an inclination relative to the axial direction of the tire. Each shoulder sipes 34 has an angle θ2 of from 15 to 25 degrees.

In this embodiment, each of the shoulder sipes 34, for example, extends from the shoulder main groove 5 to the tread edge so as to communicate with one of the recesses 35. This would suppress uneven wear on an axially outer portion of the shoulder sipes 34.

As illustrated in FIG. 1, each shoulder sipe 34, for example, is arranged so as to continue to each middle lateral groove 20 through the shoulder main groove 5 on each side of the tire equator C. This groove arrangement would further improve wear resistance of the tire.

While the particularly preferable embodiments in accordance with the present invention have been described in detail, the present invention is not limited to the illustrated embodiments, but can be modified and carried out in various aspects.

EXAMPLE

First Example

Heavy duty pneumatic tires 315/80R22.5 having a basic tread pattern illustrated in FIG. 1 were manufactured based on the detail shown in Table 1. As for a comparative example (Ref. 1), a heavy duty pneumatic tire having only the first lateral grooves as the crown and middle lateral grooves was manufactured. Then, noise performance, wet performance and wear resistance of each test tire were tested. The common specification and the test method are as follows.

Rim: 22.5×9.00
Tire inner pressure: 830 kPa
Test vehicle: Truck loaded with 50% load of maximum load at middle area of platform
Test tire installing location: All wheels
Noise Performance Test:

The test truck provided with test tires was coasted at a speed of 80 km/h on an asphalt road, and the noise was measured with a microphone set at the road. The results are indicated in Table 1 using an index based on Ref. 1 being 100. The smaller the value, the better the noise performance is.

Wet Performance Test:

On an asphalt road covered with 5 mm depth water, the time required for the test truck to run 10 meters was measured after the second gear of the truck was connected to the engine of 1500 rpm using the clutch. The results are indicated in Table 1 using an index based on Ref. 1 being 100. The smaller the value, the better the wet performance is.

Wear Resistance Test:

After traveling a certain distance on dry asphalt road, a wear amount of the middle land portion of the test tire was measured. The results are indicated in Table 1 using an index based on Ref. 1 being 100. The smaller the value, the better the wear resistance is.

Table 1 shows the test results that the example pneumatic tires offered an excellent noise performance.

TABLE 1

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Middle lateral groove main portion width W2 (mm) | 2.0 | 2.0 | 3.0 | 6.0 | 2.0 | 2.0 | 2.0 | 2.0 |
| Middle lateral groove main portion depth d3 (mm) | 2.0 | 2.0 | 2.0 | 2.0 | 0.5 | 1.5 | 3.0 | 6.0 |
| Middle lateral groove depth d2/crown main groove depth d1 | 0.72 | 0.72 | 0.72 | 0.72 | 0.72 | 0.72 | 0.72 | 0.72 |
| Axially outer portion depth d6 of sipe portion/intermediate portion depth d5 of sipe portion | 0.64 | 0.64 | 0.64 | 0.64 | 0.64 | 0.64 | 0.64 | 0.64 |
| Middle lateral groove radius R1/Middle land portion width W4 | 0.93 | 0.93 | 0.93 | 0.93 | 0.93 | 0.93 | 0.93 | 0.93 |
| Crown lateral groove angle θ1 | 15.0 | 15.0 | 15.0 | 15.0 | 15.0 | 15.0 | 15.0 | 15.0 |
| Noise performance (Index) | 100 | 91 | 93 | 95 | 90 | 91 | 93 | 94 |
| Wet performance (Index) | 100 | 100 | 97 | 96 | 103 | 101 | 99 | 96 |
| Wear resistance (Index) | 100 | 98 | 100 | 102 | 104 | 104 | 101 | 102 |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Middle lateral groove main portion width W2 (mm) | 2.0 | 2.0 | 2.0 | 2.0 | 2.0 | 2.0 | 2.0 | 2.0 |
| Middle lateral groove main portion depth d3 (mm) | 2.0 | 2.0 | 2.0 | 2.0 | 2.0 | 2.0 | 2.0 | 2.0 |
| Middle lateral groove depth d2/crown main groove depth d1 | 0.40 | 0.60 | 0.80 | 1.00 | 0.72 | 0.72 | 0.72 | 0.72 |
| Axially outer portion depth d6 of sipe portion/intermediate portion depth d5 of sipe portion | 0.64 | 0.64 | 0.64 | 0.64 | 0.30 | 0.50 | 0.70 | 0.90 |

TABLE 1-continued

| | | | | | | | | |
|---|---|---|---|---|---|---|---|---|
| Middle lateral groove radius R1/ Middle land portion width W4 | 0.93 | 0.93 | 0.93 | 0.93 | 0.93 | 0.93 | 0.93 | 0.93 |
| Crown lateral groove angle θ1 | 15.0 | 15.0 | 15.0 | 15.0 | 15.0 | 15.0 | 15.0 | 15.0 |
| Noise performance (Index) | 95 | 93 | 91 | 92 | 91 | 91 | 91 | 92 |
| Wet performance (Index) | 102 | 101 | 100 | 100 | 103 | 102 | 100 | 100 |
| Wear resistance (Index) | 100 | 100 | 101 | 103 | 101 | 98 | 101 | 104 |

| | Ex. 16 | Ex. 17 | Ex. 18 | Ex. 19 | Ex. 20 | Ex. 21 | Ex. 22 |
|---|---|---|---|---|---|---|---|
| Middle lateral groove main portion width W2 (mm) | 2.0 | 2.0 | 2.0 | 2.0 | 2.0 | 2.0 | 2.0 |
| Middle lateral groove main portion depth d3 (mm) | 2.0 | 2.0 | 2.0 | 2.0 | 2.0 | 2.0 | 2.0 |
| Middle lateral groove depth d2/crown main groove depth d1 | 0.72 | 0.72 | 0.72 | 0.72 | 0.72 | 0.72 | 0.72 |
| Axially outer portion depth d6 of sipe portion/intermediate portion depth d5 of sipe portion | 0.64 | 0.64 | 0.64 | 0.64 | 0.64 | 0.64 | 0.64 |
| Middle lateral groove radius R1/ Middle land portion width W4 | 0.70 | 0.90 | 0.95 | 1.15 | 0.93 | 0.93 | 0.93 |
| Crown lateral groove angle θ1 | 15.0 | 15.0 | 15.0 | 15.0 | 10.0 | 30.0 | 50.0 |
| Noise performance (Index) | 92 | 91 | 91 | 91 | 91 | 92 | 93 |
| Wet performance (Index) | 100 | 100 | 102 | 103 | 101 | 100 | 100 |
| Wear resistance (Index) | 104 | 99 | 100 | 103 | 97 | 100 | 104 |

Second Example

Heavy duty pneumatic tires 11R22.5 having the basic tread pattern illustrated in FIG. 1 were manufactured based on the detail shown in Table 2. As for a comparative example (Ref. 2), a heavy duty pneumatic tire was also manufactured wherein the tire is provided with the middle lateral grooves extend in an arc shape having a center of curvature of the arc shape located axially outward with respect to the center of the middle land portion in an axial direction of the tire. Note that the comparative example is substantially the same structure as the example tires except the curved shape of the middle lateral grooves. Then, steering stability, wet performance and wear resistance of each test tire were tested. The common specification and the test method are as follows.
Rim: 22.5×7.50
Tire inner pressure: 900 kPa
Test vehicle: Truck loaded with 50% load of maximum load at middle area of platform
Test tire installing location: All wheels Steering Stability Test:
A test driver drove the truck on dry asphalt road, and evaluated steering stability by his feeling. The results are indicated in Table 2 by scores based on Ref. 2 being 100, wherein the larger the value, the better the performance is.

Wet Performance Test:
The test truck was driven on a wet asphalt road with 2 mm depth of water and braked at speed of 65 km/hr. Then, the time required to slow down the truck from 60 km/hr to 20 km/hr was measured. The results are indicated in Table 2 by an index based on Ref. 2 being 100, wherein the smaller the value, the better the performance is.

Wear Resistance Test:
This test was conducted in the same procedure as described above.

Table 2 shows the test results that the example pneumatic tires further improved the steering stability, wet performance and wear resistance in good balance.

TABLE 2

| | Ref. 2 | Ex. 1 | Ex. 2 | Ex. 3 | Ex. 4 | Ex. 5 | Ex. 6 | Ex. 7 |
|---|---|---|---|---|---|---|---|---|
| Middle lateral groove pitches L1/middle land portion width W4 | 1.15 | 1.15 | 1.05 | 1.25 | 1.15 | 1.15 | 1.15 | 1.15 |
| Middle lateral groove radius R1/middle land portion width W4 | 0.93 | 0.93 | 0.93 | 0.93 | 0.8 | 0.9 | 0.95 | 1.05 |
| Middle lateral groove main portion depth d3 (mm) | 2.0 | 2.0 | 2.0 | 2.0 | 2.0 | 2.0 | 2.0 | 2.0 |
| Middle lateral groove sipe portion depth d4/main portion depth d3 | 5.5 | 5.5 | 5.5 | 5.5 | 5.5 | 5.5 | 5.5 | 5.5 |
| Axially outer portion depth d6 of sipe portion/intermediate portion depth d5 of sipe portion | 0.70 | 0.70 | 0.70 | 0.70 | 0.70 | 0.70 | 0.70 | 0.70 |
| Steering stability (Scores) | 100 | 106 | 105 | 106 | 106 | 106 | 105 | 104 |
| Wet performance (Index) | 100 | 95 | 95 | 96 | 93 | 94 | 95 | 96 |
| Wear resistance (Index) | 100 | 100 | 100 | 99 | 103 | 102 | 99 | 97 |

| | Ex. 8 | Ex. 9 | Ex. 10 | Ex. 11 | Ex. 12 | Ex. 13 | Ex. 14 | Ex. 15 |
|---|---|---|---|---|---|---|---|---|
| Middle lateral groove pitches L1/middle land portion width W4 | 1.15 | 1.15 | 1.15 | 1.15 | 1.15 | 1.15 | 1.15 | 1.15 |
| Middle lateral groove radius R1/middle land portion width W4 | 0.93 | 0.93 | 0.93 | 0.93 | 0.93 | 0.93 | 0.93 | 0.93 |
| Middle lateral groove main portion depth d3 (mm) | 1.5 | 3.0 | 2.0 | 2.0 | 2.0 | 2.0 | 2.0 | 2.0 |

TABLE 2-continued

| | | | | | | | | |
|---|---|---|---|---|---|---|---|---|
| Middle lateral groove sipe portion depth d4/main portion depth d3 | 5.5 | 5.5 | 4.5 | 6.5 | 5.5 | 5.5 | 5.5 | 5.5 |
| Axially outer portion depth d6 of sipe portion/intermediate portion depth d5 of sipe portion | 0.70 | 0.70 | 0.70 | 0.70 | 0.60 | 0.65 | 0.75 | 0.80 |
| Steering stability (Scores) | 106 | 104 | 106 | 105 | 107 | 106 | 106 | 105 |
| Wet performance (Index) | 97 | 95 | 96 | 94 | 97 | 96 | 95 | 95 |
| Wear resistance (Index) | 99 | 100 | 100 | 100 | 99 | 99 | 100 | 100 |

What is claimed is:

1. A pneumatic tire comprising:
   a tread portion being provided with at least one circumferentially and continuously extending main groove and at least one land portion adjacent to the main groove;
   the land portion being provided with a plurality of lateral grooves extending across the land portion;
   each lateral groove comprising a main portion having a width equal to or more than 2.0 mm and a bottom, and a sipe portion having a width smaller than the width of the main portion and extending radially inwardly from the bottom of the main portion;
   the main portion comprising a first wall located on a first side in a circumferential direction of the tire and a second wall located on a second side in the circumferential direction of the tire;
   the sipe portion comprising a first sipe wall located on the first side and a second sipe wall located on the second side;
   the lateral grooves comprising
     a first lateral groove having the first wall being continuous to the first sipe wall smoothly so as to form a single plane wall and the second wall connecting to the second sipe wall in a step manner,
     a second lateral groove having the second wall being continuous to the second sipe wall smoothly so as to form a single plane wall, the first wall connecting to the first sipe wall in a step manner; and
   the first lateral groove and the second lateral groove being arranged alternately in the circumferential direction of the tire such that the first lateral groove second wall and the second lateral groove first wall alternate in the circumferential direction of the tire,
   wherein the at least one main groove comprises a pair of crown main grooves to form a crown land portion therebetween on a tire equator and at least one middle land portion disposed axially outward of one of the crown main grooves, the lateral grooves comprise a plurality of crown lateral grooves on the crown land portion and a plurality of middle lateral grooves on the middle land portion, each of the middle lateral grooves curves has an arc shape in a plan view of the tread portion, and a center of curvature of the arc shape is located on an inner region which is an inner half region of the middle land portion in an axial direction of the tire.

2. The pneumatic tire according to claim 1, wherein depths of the lateral grooves are in a range of from 0.50 to 0.90 times of a depth of the main groove.

3. The pneumatic tire according to claim 1, wherein at least one of the lateral grooves comprises the sipe portion comprising an axially central part and a pair of end parts having depths greater than that of the central part.

4. The pneumatic tire according to claim 1, wherein at least one of the lateral grooves comprises the main portion having a width increasing toward the main groove.

5. The pneumatic tire according to claim 1, wherein the crown lateral grooves and the middle lateral grooves are arranged alternately in the circumferential direction of the tire.

6. The pneumatic tire according to claim 1, wherein a radius of curvature of each middle lateral groove is in a range of from 0.80 to 1.05 times of a width of the middle land portion.

7. The pneumatic tire according to claim 5, wherein the crown lateral grooves extends in a straight shape at an angle of from 10 to 30 degrees with respect to the axial direction of the tire.

8. The pneumatic tire according to claim 5, wherein each of the crown lateral grooves extends so as to continue to each of the middle lateral grooves smoothly through the crown main groove.

9. The pneumatic tire according to claim 1, wherein the first lateral groove comprises the second wall connected to the second sipe wall in a step manner, and the second lateral groove comprises the first wall connected to the first sipe wall in a step manner.

10. The pneumatic tire according to claim 1, wherein an inclination angle of the main portion and the sipe portion of the lateral grooves, with respect to the tire radial direction, is substantially zero.

11. A pneumatic tire comprising:
    a tread portion being provided with circumferentially and continuously extending main grooves to form a crown land portion, a pair of middle land portions disposed axially outward of the crown land portion, and a pair of shoulder land portions disposed axially outward of the pair of middle land portions;
    the crown land portion being provided with crown lateral grooves each extending in a straight shape and inclined at an angle with respect to the axial direction of the tire;
    each of the pair of middle land portions being provided with middle lateral grooves, wherein each middle lateral groove curves in an arc shape in a plan view of the tread portion;
    each of the pair of shoulder land portions being provided with shoulder sipes each extending in a straight shape so as to traverse each of the pair of shoulder land portions completely,
    each crown lateral groove and each middle lateral groove comprising a main portion having a width equal to or more than 2.0 mm and a bottom, and a sipe portion having a width smaller than the width of the main portion and extending radially inwardly from the bottom of the main portion;
    the main portion comprising a first wall located on a first side in a circumferential direction of the tire and a second wall located on a second side in the circumferential direction of the tire;

the sipe portion comprising a first sipe wall located on the first side and a second sipe wall located on the second side;

the lateral grooves comprising
- a first lateral groove having the first wall being continuous to the first sipe wall smoothly so as to form a single plane wall and the second wall connecting to the second sipe wall in a step manner,
- a second lateral groove having the second wall being continuous to the second sipe wall smoothly so as to form a single plane wall, the first wall connecting to the first sipe wall in a step manner; and the first lateral groove and the second lateral groove being arranged alternately in the circumferential direction of the tire such that the first lateral groove second wall and the second lateral groove first wall alternate in the circumferential direction of the tire.

12. The pneumatic tire according to claim 11, wherein the crown land portion is provided with only the crown lateral grooves, the pair of middle land portions is provided with only the middle lateral grooves, and the pair of shoulder land portions is provided with only the plurality of shoulder sipes.

13. The pneumatic tire according to claim 12, wherein the shoulder sipes are inclined in an opposite direction to the crown lateral grooves.

* * * * *